US006712037B2

(12) United States Patent
Xu

(10) Patent No.: US 6,712,037 B2
(45) Date of Patent: Mar. 30, 2004

(54) LOW PRESSURE DIRECT INJECTION ENGINE SYSTEM

(75) Inventor: Min Xu, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/042,784

(22) Filed: Jan. 9, 2002

(65) Prior Publication Data

US 2003/0127070 A1 Jul. 10, 2003

(51) Int. Cl.[7] .......... F02M 37/08
(52) U.S. Cl. .......... 123/305; 123/456; 123/458; 123/497
(58) Field of Search .......... 123/298, 305, 123/497, 456, 458, 309, 308, 506

(56) References Cited

U.S. PATENT DOCUMENTS 4,389,986 A 6/1983 Tanasawa .......... 123/298
5,058,548 A 10/1991 Morikawa et al. .......... 123/298
5,237,975 A 8/1993 Betki et al. .......... 123/497
5,331,933 A * 7/1994 Matsushita .......... 123/295
5,335,635 A 8/1994 Kadoi et al. .......... 123/295
5,398,655 A 3/1995 Tuckey .......... 123/456
5,673,670 A 10/1997 Powell et al. .......... 123/463
5,718,203 A * 2/1998 Shimada et al. .......... 123/305
5,730,099 A * 3/1998 Gillespie .......... 123/295
5,755,207 A * 5/1998 Kushibe .......... 123/478
5,762,040 A * 6/1998 Taipale et al. .......... 123/299
5,791,304 A * 8/1998 Taipale .......... 123/73 C
5,881,694 A * 3/1999 Nakada .......... 123/305
5,884,611 A * 3/1999 Tarr et al. .......... 123/531
5,924,404 A * 7/1999 Ruman et al. .......... 123/406.18
5,941,207 A 8/1999 Anderson et al. .......... 123/295
5,983,853 A 11/1999 Roessler et al. .......... 123/295
6,009,851 A * 1/2000 Iida et al. .......... 123/339.12
6,024,064 A * 2/2000 Kato et al. .......... 123/179.17
6,032,562 A 3/2000 Brunson et al. .......... 83/471.3
6,035,830 A * 3/2000 Saito .......... 123/457
6,050,232 A * 4/2000 Grob et al. .......... 123/179.16
6,062,201 A * 5/2000 Nozawa et al. .......... 123/478
6,138,637 A 10/2000 Bubeck .......... 123/295
6,148,792 A * 11/2000 Hei Ma .......... 123/298
6,227,164 B1 5/2001 Miller .......... 123/298
6,227,174 B1 * 5/2001 Hedrick et al. .......... 123/495
6,230,688 B1 * 5/2001 Faix et al. .......... 123/495
6,273,056 B1 * 8/2001 Shirakawa et al. .......... 123/305
6,334,427 B1 1/2002 Nakayama et al. .......... 123/305
6,386,175 B2 * 5/2002 Yang .......... 123/298
6,439,190 B1 * 8/2002 Bochum .......... 123/295
6,450,417 B1 * 9/2002 Gipson et al. .......... 239/5
6,478,007 B2 * 11/2002 Miyashita et al. .......... 123/295
6,497,217 B2 * 12/2002 Kojima .......... 123/456
2001/0011537 A1 8/2001 Joos et al. .......... 123/497
2002/0000209 A1 * 1/2002 Ando et al. .......... 123/21
2002/0043240 A1 * 4/2002 Samenfink et al. .......... 123/298

FOREIGN PATENT DOCUMENTS

WO WO 99/4031 8/1999
WO WO 02/014677 A1 2/2002
WO WO 02/014678 A1 2/2002

* cited by examiner

*Primary Examiner*—Hieu T. Vo
*Assistant Examiner*—Hai Huynh
(74) *Attorney, Agent, or Firm*—Brinks Hofer Gilson & Lione

(57) ABSTRACT

A low pressure direct injection engine system for a vehicle includes an engine having a plurality of cylinders each including a piston wherein the cylinders and a top portion of the pistons define a plurality of combustion chambers. A fuel injector is mounted in fluid communication with each of the combustion chambers. Each fuel injector has a nozzle which is adapted to generate a fine fuel spray with droplet sizes of 25 micro-meters SMD and 45 micro-meters DV90 and low penetration at fuel pressure of roughly 2 MPa. A low pressure fuel delivery system is adapted to deliver fuel from a fuel tank within the vehicle to the fuel injectors, and an igniter is mounted within the combustion chamber which is adapted to ignite the fuel within the combustion chamber.

10 Claims, 3 Drawing Sheets

32
20
22
24
12
18
16
14
26
28

LOW PRESSURE DIRECT INJECTION ENGINE SYSTEM

TECHNICAL FIELD OF THE INVENTION

The present invention generally relates to a fuel delivery system for an automotive vehicle.

BACKGROUND OF THE INVENTION

Stringent emission standards for internal combustion engines suggest the use of advanced fuel metering techniques that provide extremely small fuel droplets. The fine atomization of the fuel not only improves emission quality of the exhaust, but also improves the cold start capabilities, fuel consumption and performance. Typically, optimization of the droplet size is dependant upon the pressure of the fuel, and requires high pressure delivery at roughly 7–10 MPa. However, higher fuel delivery pressure causes greater dissipation of the fuel within the cylinder, and propagates the fuel further outward away from the injector nozzle. This propagation makes it more likely that the fuel spray will condense on the walls of the cylinder and the top surface of the piston, which decreases the efficiency of the combustion and increases emissions.

Additionally, high pressure fuel systems typically require two fuel pumps. One low pressure pump within the gas tank, and one high pressure pump, which is driven by the camshaft of the engine and pumps the fuel at high pressure to the fuel rail. Upon starting, the engine is running slow, therefore, the high pressure pump which is driven by the camshaft of the engine takes a relatively long time to create the high pressures required by the system. At high engine speeds, the engine cannot use all of the fuel that the pump supplies, therefore, excessive fuel is bled back into the gas tank from the fuel rail. Further, most high pressure fuel pumps are piston pumps. Piston pumps have the distinct characteristic of delivering the fuel in pulses, whereby there is a surge of high pressure when the piston is pumping, and a lower pressure lag during the piston return stroke. Rotary pumps do not exhibit this pulsing behavior, however, rotary pumps are not capable of producing the high pressures that are required by a high pressure fuel delivery system. Therefore, there is a need in the industry for improvements upon existing fuel delivery systems, specifically, there is a need for a fuel delivery system which will deliver fuel to the cylinders of an automotive engine with a fine droplet size without requiring a high pressure auxiliary fuel pump.

DETAILED DESCRIPTION OF THE INVENTION

The following description of the preferred embodiment of the invention is not intended to limit the scope of the invention to this preferred embodiment, but rather to enable any person skilled in the art to make and use the invention.

Figure 1:
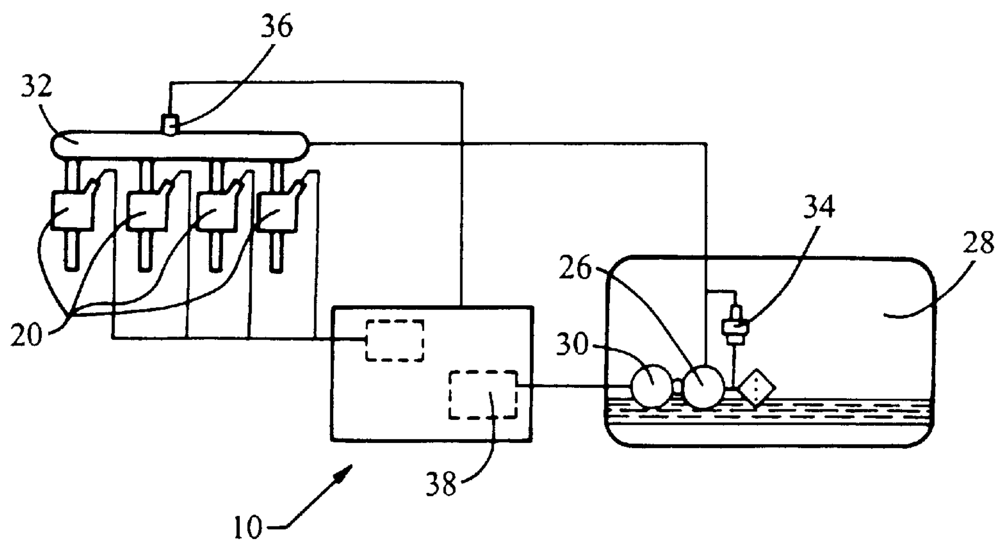
FIG. 1 is a schematic view of a low pressure direct injection system of the preferred embodiment.
Figure 2:
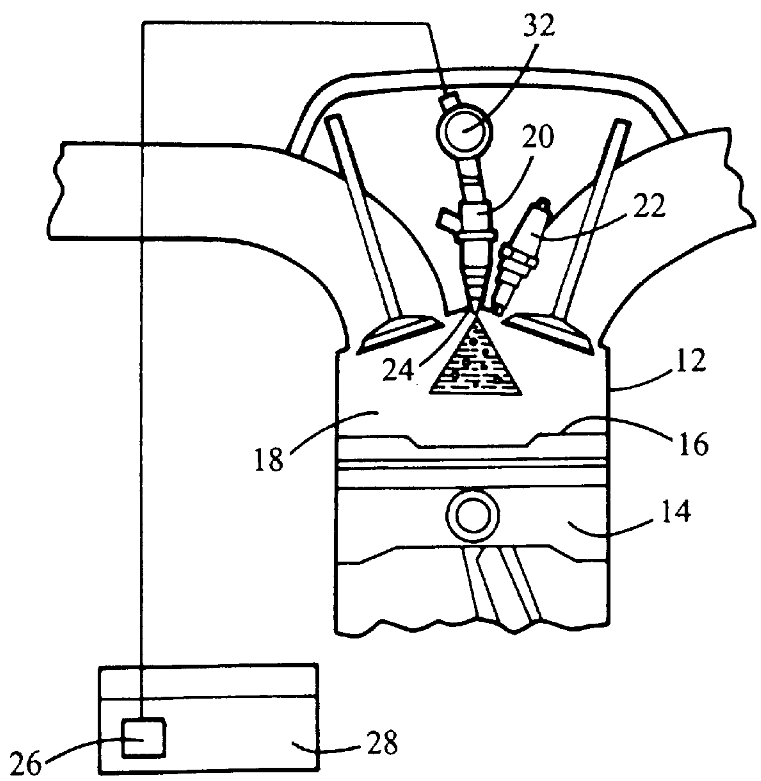
FIG. 2 is a sectional view of a piston and combustion chamber of the low pressure direct injection engine system of the preferred embodiment.

Referring to FIGS. 1 and 2, a low pressure direct injection system for a vehicle is shown generally at 10. The direct injection system 10 includes an engine having a plurality of cylinders 12. Each of the cylinders 12 includes a piston 14 wherein the cylinders 12 and a top portion 16 of the pistons 14 define a plurality of combustion chambers 18.

Each of the cylinders 12 includes a fuel injector 20 mounted on the cylinder 12 in fluid communication with the combustion chamber 18. Each of the cylinders 12 also includes an igniter 22 mounted within the combustion chamber 18 which is adapted to ignite fuel that is injected into the combustion chamber 18. The fuel injector 20 includes a nozzle 24 which is adapted to spray the fuel within the combustion chamber 18. Preferably, the nozzle 24 is adapted to produce a spray with droplet sizes of about 25 micro-meters SMD (Sauter Mean Diameter) and about 45 micro-meters DV90 (largest droplet size) at fuel pressure of roughly 2 MPa. Typically, droplet sizes of this magnitude are only possible at fuel pressures higher than 2 MPa. A detailed description of a nozzle 24 that is suitable for use with the present invention is described in a related application U.S. Ser. No. 10/043,367 entitled "Fuel Injector Nozzle Assembly", filed on Jan. 9, 2002, and assigned to the assignee of the present invention and is hereby incorporated by reference into this application.

A low pressure fuel pump 26 is adapted to deliver fuel from a fuel tank 28 within the vehicle to the fuel injectors 20. Preferably, the fuel pump 26 is a rotary type pump 26 which is mounted within the fuel tank 28 and driven by an electric motor 30. The fuel pump 26 is connected to a fuel rail 32 which is adapted to supply fuel to the fuel injectors 20. The fuel pump 26 is adapted to supply fuel to the fuel rail 32 at pressures of about 2 MPa, which is high enough to obtain satisfactory spray quality while being significantly lower that the pressures of typical high pressure systems.

Figure 3:
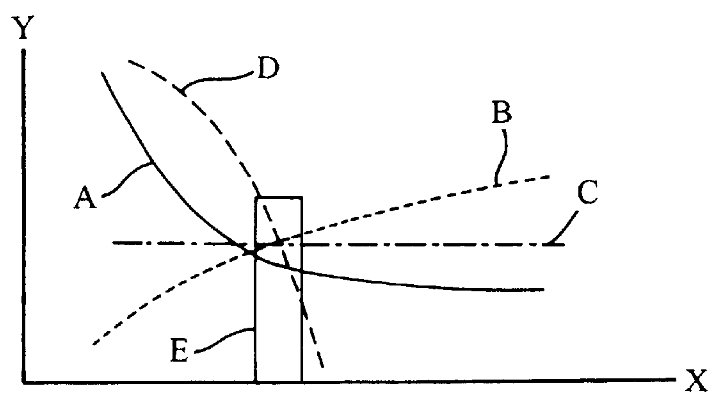
FIG. 3 is a graph showing the relationship between fuel pressure and injector flow rate, fuel droplet size and pump type.

Referring to FIG. 3, a graph illustrates how the fuel supply pressure is determined for the low pressure direct injection system 10 of the present invention. The x axis represents fuel pressure increasing from left to right. The spray drop size of the fuel is represented by line A, wherein the droplet size is measured along the y axis. As shown by line A, the spray droplet size gets smaller as the fuel pressure gets higher. The injector 20 flow rate is indicated by line B, where the flow rate is measured along the y axis. As shown by line B, the flow rate increases as the fuel pressure increases. The flow rate of a piston pump is shown line C, the piston pump maintains a constant flow at all fuel pressures, but the rotary pump 26 loses flow rate as the fuel pressure increases, as shown by line D. Therefore, the flow rate of the injectors 20, the rotary fuel pump, and the droplet size must be optimized. A window is indicated by E, wherein the window indicates the lowest fuel pressure at which the required fuel droplet size can be achieved. The window is very near to the highest pressure that the rotary pump 26 can attain. That is why the fuel injector nozzle 24 is important. Without a nozzle 24 that is adapted to create the required fuel droplet size at lower pressures, then the rotary pump 26 would not meet the pressure requirements of the system 10.

Figure 4:
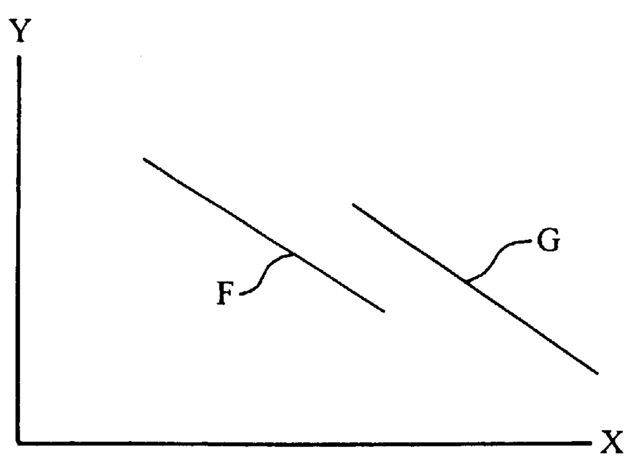
FIG. 4 is a graph showing the relationship between fuel pressure and fuel droplet size for the present invention and for a high pressure direct injection system.

Referring to FIG. 4, a logarithmic scale graph illustrates the differences of the fuel droplet size between the low pressure direct injection system 10 of the present invention and a typical high pressure direct injection system. Along the x axis, fuel pressure increases from left to right, and along the y axis, fuel droplet size increases moving upward. A line indicated by F represents the fuel droplet size produced by the system 10 of the present invention as the fuel pressure varies. A line indicated by G represents the fuel droplet size produced by a typical high pressure system. Both the low pressure injector and the high pressure injector deliver fuel at the same flow rate. As shown, the system 10 of the present invention can produce droplet sizes comparable to the droplet sizes of the high pressure systems, but at lower fuel pressure, thereby allowing the use of a lower pressure fuel pump 26.

Referring again to FIGS. 1 and 2, there are different methods which can be used to control the pressure of the fuel within the system 10. In one such method, the fuel pump 26 includes a regulator valve 34 which is adapted to bleed back excessive flow generated by the fuel pump 26 to maintain a roughly constant fuel pressure in the system 10. Here, the fuel pump 26 runs at a constant speed, therefore, as the demand for fuel at the injectors 20 varies, the pressure within the system 10 will fluctuate depending on the regulator valve 34 banwidth. When the injectors 20 are not using all of the fuel that is being pumped, the pressure will go up. When this happens, the regulator valve 34 will allow fuel to leak back into the fuel tank 28 to keep the pressure at the injectors 20 consistent.

In another method of controlling the pressure within the system 10, a sensor 36 is mounted within the fuel rail 32 to detect the fuel pressure. The electric motor 30 which drives the fuel pump 26 is controlled by a motor controller 38 such that the fuel pump 26 can run at varying speeds. The sensor 36 is adapted to instantaneously send a signal to the motor controller 38 to increase or decrease the speed of the fuel pump 26 based upon the pressures detected within the fuel rail 32. Preferably, the system 10 will incorporate a combination of the two methods described wherein the sensor 36 within the fuel rail 32 will provide rough speed control of the fuel pump 26 and the regulator valve 34 will provide fine adjustments to keep the pressure within the system 10 very nearly constant.

Ideally, the fuel spray should have low penetration, small droplet size, and a wide spray angle. Typical high pressure systems can meet the small droplet size and wide angle requirements, but the high pressure systems will always have high penetration into the combustion chamber 18 due to the velocity of the fuel coming from the injector 20. Since the spray of the present invention is at low pressure there is very low penetration into the combustion chamber 18. This "soft spray" provides a fuel droplet size that is similar to the droplet size in high pressure systems but with much lower penetration distance into the combustion chamber 18. Low penetration will reduce or eliminate wall wetting, where the fuel condenses along the sides of the combustion chamber 18. Low penetration also insures that the fuel spray moves slower than the piston 14 during the intake stroke to prevent fuel from condensing on the top portion 16 of the piston 14. Additionally, a low penetration "soft spray" will keep the spray cloud or stratification near a top portion 26 of the combustion chamber 18.

Figure 5:
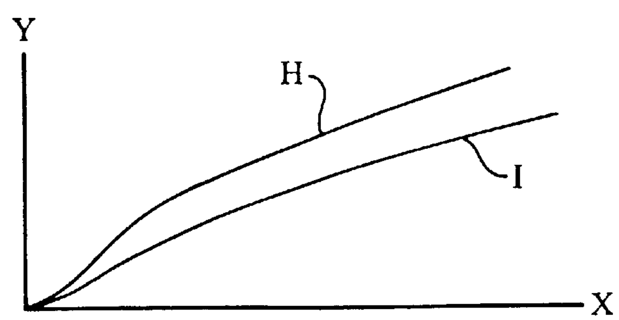
FIG. 5 is a graph showing the relationship between time and spray penetration for the present invention and for a high pressure direct injection system.

Referring to FIG. 5, a graph illustrates the distance of spray penetration over time of the system 10 of the present invention and a high pressure system. Time is measured along the x axis and the distance of spray penetration is measured along the y axis. A line indicated by H represents the amount of spray penetration by the high pressure system. A line indicated by I represents the amount of spray penetration by the system 10 of the present invention. As shown, the spray penetration of the system 10 of the present invention is less than the spray penetration of the high pressure system.

Figure 6:
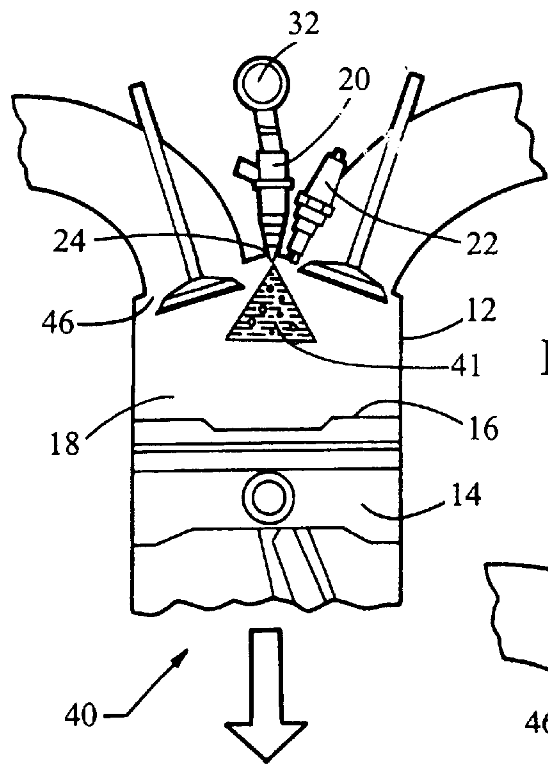
FIG. 6 is a sectional view of a piston and combustion chamber of the low pressure direct injection engine system of the preferred embodiment using a homogenous charge combustion process.

Preferably, the stoichiometric combustion charge within the combustion chamber 18 is homogenous. A stoichiometric homogenous charge is where the fuel to air ratio is equal to the stoichiometric ratio, and fuel is thoroughly mixed with air, so that there is just enough oxygen in the combustion chamber 18 to burn up all of the fuel. Ideally, in a homogenous charge system, after combustion, there is no remaining oxygen or fuel. Referring to FIG. 6, a system following a homogenous charge process is shown at 40. The fuel injector 20 and the igniter 22 are mounted centrally within the top portion of the combustion chamber 18. The fuel is injected during the piston 14 intake stroke, where the piston moved downward as indicated by arrow J, and the intake valves are open. In a typical high pressure system, the cone shape of the spray cloud is hollow, which causes less efficient combustion of the fuel. In the low pressure system 10 of the present invention, using the homogenous charge process, the spray cloud 41 remains solid and has a wide angle, thereby providing more efficient combustion of the fuel.

Figure 7:
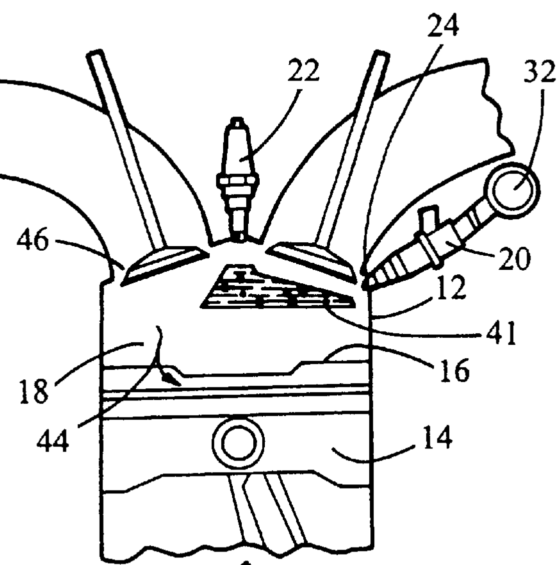
FIG. 7 is a sectional view of a piston and combustion chamber of the low pressure direct injection engine system of the preferred embodiment using an air guided stratified charge combustion process.

There are other combustion charge processes that are more efficient that the homogenous charge system 40 which are limited by high pressure systems, but work better with the low pressure system 10 of the present invention. Referring to FIG. 7, a system using an air guided stratified charge system is shown at 42. The fuel is injected during the compressions stroke of the piston 14, when the piston 14 moves upward, as shown by arrow K. The injector 20 is mounted on a side of the combustion chamber 18. When the fuel is injected, an air current 44 from the intake valve 46 causes the spray cloud 41 to be deflected upward near the igniter 22.

Figure 8:
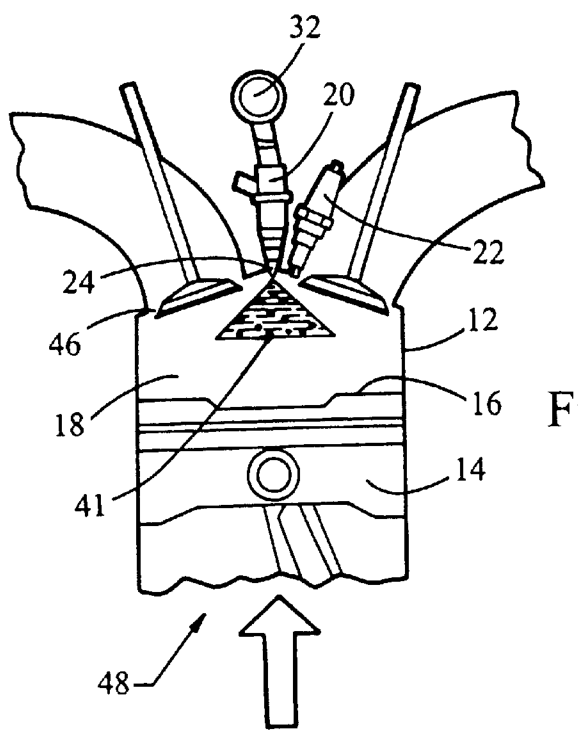
FIG. 8 is a sectional view of a piston and combustion chamber of the low pressure direct injection engine system of the preferred embodiment using a spray guided stratified charge combustion process.

Referring to FIG. 8, a spray guided stratified charge system 48 is shown. Again, the fuel is injected during the compression stroke, when the piston 14 moves upward as indicated by arrow L. The fuel injector 20 and the igniter 22 are mounted at the top of the combustion chamber 18 such that when the fuel is injected into the denser air which has been compressed by the advancing piston 14, the upward moving piston 14 forms the spray cloud 41 upward near the igniter 22. Both the air guided and spray guided systems 42, 48 are typically run lean, which means that there is more air than fuel. A lean air/fuel mixture will result in more efficient combustion and therefore better fuel economy, however these systems do not work well at high pressures. Because the piston 14 is in the forward stroke, moving toward the top of the combustion chamber 18, the high penetration of a high pressure system would cause wall wetting and piston wetting in the air guided and spray guided systems 42, 48.

The foregoing discussion discloses and describes one preferred embodiment of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

I claim:

1. A low pressure direct injection engine system for a vehicle comprising an engine having a plurality of cylinders, each of said cylinders including a piston wherein said cylinders and a top portion of said pistons define a plurality of combustion chambers;

a plurality of direct injection fuel injectors, one of said injectors being mounted in fluid communication with each of said combustion chambers and having a nozzle adapted to disperse fuel injected through said nozzle into said combustion chamber at a fuel pressure of roughly 2 MPa;

a fuel pump adapted to deliver fuel from a fuel tank within the vehicle, through a fuel rail of the vehicle, to said fuel injectors, said fuel pump comprising a rotary fuel pump mounted within the fuel tank of the vehicle and driven by an electric motor;

an igniter mounted within said combustion chamber adapted to ignite fuel within said combustion chamber; and a motor controller adapted to control the speed of said electric motor and a sensor mounted within said fuel rail, said sensor adapted to sense the pressure of the fuel within the fuel rail and to send a signal to said motor controller whereby said motor controller controls the speed of said electric motor such that said fuel pump maintains a roughly constant fuel pressure.

2. The system of claim 1 wherein nozzles are adapted to create a fuel spray having a fine droplet size of about 25 micro-meters SMD and 45 micro-meters DV90 at fuel pressure of roughly 2 MPa.

3. The system of claim 1 wherein said fuel injector and said igniter are centrally mounted within a top portion of said combustion chamber and the fuel is injected into said combustion chamber during the intake stroke and the fuel to air ratio is stoichoimetric.

4. The system of claim 1 wherein said fuel injector is mounted within a side of said combustion chamber and said igniter is mounted centrally within a top portion of said combustion chamber and the fuel is injected into said combustion chamber during the compression stroke whereby air flowing from an intake deflects the spray of the fuel toward the igniter.

5. The system of claim 1 wherein said fuel injector and said igniter are centrally mounted within a top portion of said combustion chamber and the fuel is injected into said combustion chamber during the compression stroke whereby the fuel spray is formed into a spray cloud near said top portion of said combustion chamber.

6. The system of claim 1 wherein said fuel pump is adapted to deliver fuel at a pressure of approximately 2 MPa.

7. The system of claim 1 further including a regulator mounted on said fuel pump which is adapted to bleed back excessive flow generated by said fuel pump such that the fuel pressure is maintained nearly constant.

8. A low pressure direct injection engine system for a vehicle comprising an engine having a plurality of cylinders, each of said cylinders including a piston wherein said cylinders and a top portion of said pistons define a plurality of combustion chambers;

a plurality of direct injection fuel injectors, one of said injectors being mounted in fluid communication with each of said combustion chambers and having a nozzle adapted to disperse fuel injected through said nozzle into said combustion chamber with a fuel spray having a fine droplet size of about 25 micro-meters SMD and 45 micro-meters DV90 and low penetration at fuel pressure of roughly 2 MPa;

a fuel rail adapted supply fuel to each of said fuel injectors;

a rotary fuel pump mounted within a fuel tank of the vehicle and connected to said fuel rail, said fuel pump being driven by an electric motor and adapted to deliver fuel from a fuel tank within the vehicle to said fuel rail at roughly 2 MPa;

a regulator mounted on said fuel pump which is adapted to bleed back excessive flow generated by said fuel pump to maintain a roughly constant fuel pressure;

a motor controller adapted to control the speed of said electric motor and a sensor mounted within said fuel rail, said sensor adapted to sense the pressure of the fuel within the fuel rail and to send a signal to said motor controller whereby said motor controller controls the speed of said electric motor such that said fuel pump maintains a roughly constant fuel pressure;

an igniter mounted within said combustion chamber adapted to ignite fuel within said combustion chamber.

9. A low pressure direct injection engine system for a vehicle comprising:

an engine having a plurality of cylinders, each of said cylinders including a piston wherein said cylinders and a top portion of said pistons define a plurality of combustion chambers;

a plurality of direct injection fuel injectors, one of said injectors being mounted in fluid communication with each of said combustion chambers and having a nozzle adapted to disperse fuel injected through said nozzle into said combustion chamber with a fuel spray having a fine droplet size of about 25 micro-meters SMD and 45 micro-meters DV90 and low penetration at fuel pressure of less than approximately 5 MPa;

a fuel rail adapted supply fuel to each of said fuel injectors;

a rotary fuel pump mounted within a fuel tank of the vehicle and connected to said fuel rail, said fuel pump being driven by an electric motor and adapted to deliver fuel from a fuel tank within the vehicle to said fuel rail at roughly 2 MPa;

a regulator mounted on said fuel pump which is adapted to bleed back excessive flow generated by said fuel pump to maintain a roughly constant fuel pressure;

a motor controller adapted to control the speed of said electric motor and a sensor mounted within said fuel rail, said sensor adapted to sense the pressure of the fuel within the fuel rail and to send a signal to said motor controller whereby said motor controller controls the speed of said electric motor such that said fuel pump maintains a roughly constant fuel pressure;

an igniter mounted within said combustion chamber adapted to ignite fuel within said combustion chamber.

10. A low pressure direct injection engine system for a vehicle comprising:

an engine having a plurality of cylinders, each of said cylinders including a piston wherein said cylinders and a top portion of said pistons define a plurality of combustion chambers;

a plurality of direct injection fuel injectors, one of said injectors being mounted in fluid communication with each of said combustion chambers and having a nozzle adapted to disperse fuel injected through said nozzle into said combustion chamber with a fuel spray having a fine droplet size of about 25 micro-meters SMO and 45 micro-meters DV90 and low penetration at fuel pressure of approximately 2 MPa or less;

a fuel rail adapted supply fuel to each of said fuel injectors;

a rotary fuel pump mounted within a fuel tank of the vehicle and connected to said fuel rail, said fuel pump being driven by an electric motor and adapted to deliver fuel from a fuel tank within the vehicle to said fuel rail at roughly 2 MPa;

a regulator mounted on said fuel pump which is adapted to bleed back excessive flow generated by said fuel pump to maintain a roughly constant fuel pressure;

a motor controller adapted to control the speed of said electric motor and a sensor mounted within said fuel rail, said sensor adapted to sense the pressure of the fuel within the fuel rail and to send a signal to said motor controller whereby said motor controller controls the speed of said electric motor such that said fuel pump maintains a roughly constant fuel pressure;

an igniter mounted within said combustion chamber adapted to ignite fuel within said combustion chamber.

* * * * *

UNITED STATES PATENT AND TRADEMARK OFFICE

CERTIFICATE OF CORRECTION

PATENT NO. : 6,712,037 B2
DATED : March 30, 2004
INVENTOR(S) : Min Xu

It is certified that error appears in the above-identified patent and that said Letters Patent is hereby corrected as shown below:

Title page,
Item [56], References Cited, FOREIGN PATENT DOCUMENTS, delete "WO 99/4031" and substitute -- WO 99/40313 -- in its place.

Column 5,
Line 11, immediately after "comprising" insert -- : -- (colon).

Column 7,
Line 10, delete "SMO" and substitute -- SMD -- in its place.

Signed and Sealed this

Nineteenth Day of October, 2004

JON W. DUDAS
*Director of the United States Patent and Trademark Office*